United States Patent
Lockett, Sr.

(10) Patent No.: US 7,030,065 B2
(45) Date of Patent: *Apr. 18, 2006

(54) SOLID LUBRICANT FOR LUBRICATING ROTARY TRUNNION SUPPORTED EQUIPMENT

(75) Inventor: Alan C. Lockett, Sr., Marietta, GA (US)

(73) Assignee: C&C Oil Company, Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/896,737

(22) Filed: Jul. 22, 2004

(65) Prior Publication Data

US 2005/0277555 A1    Dec. 15, 2005

Related U.S. Application Data

(63) Continuation of application No. 10/198,770, filed on Jul. 18, 2002, now Pat. No. 6,767,870.

(51) Int. Cl.
*C10M 103/00*    (2006.01)
*C10M 105/74*    (2006.01)

(52) U.S. Cl. ............... 508/123; 508/103; 508/104; 508/105

(58) Field of Classification Search ............... 508/103, 508/104, 105
See application file for complete search history.

(56) References Cited

U.S. PATENT DOCUMENTS

| | | | |
|---|---|---|---|
| 4,045,400 A | | 8/1977 | Korshak et al. |
| 4,312,772 A | * | 1/1982 | Mori .................. 428/545 |
| 4,318,821 A | | 3/1982 | Harris et al. |
| 4,612,127 A | | 9/1986 | Uematsu et al. |
| 4,713,186 A | * | 12/1987 | Kristen et al. ........... 508/117 |
| 5,288,792 A | * | 2/1994 | Buxbaum ............... 508/108 |
| 5,668,091 A | | 9/1997 | Grinham et al. |
| 5,732,322 A | * | 3/1998 | Nakamaru et al. ....... 428/550 |
| 6,767,870 B1 | * | 7/2004 | Lockett, Sr. ............ 508/105 |

* cited by examiner

*Primary Examiner*—Ellen M. McAvoy
(74) *Attorney, Agent, or Firm*—Jason A. Bernstein; Powell Goldstein LLP

(57) ABSTRACT

A solid lubricant bar for use in high temperature environments, such as rotary kilns, comprising an organo phosphate, such as triphenyl phosphate, a solid lubricant selected from the group comprising graphite, molybdenum, boron, boron nitride, tungsten, polytetrafluoroethylene, and mixtures thereof; and a soft metal selected from the group consisting of copper, aluminum, tin and mixtures thereof. The solid lubricant bar has an auto-ignition temperature of at least about 1,000 degrees Fahrenheit (537 degrees Celsius).

15 Claims, No Drawings

SOLID LUBRICANT FOR LUBRICATING ROTARY TRUNNION SUPPORTED EQUIPMENT

CROSS-REFERENCE TO RELATED APPLICATION

This is a continuation application of application Ser. No. 10/198,770, filed Jul. 18, 2002, now U.S. Pat. No. 6,767,870, the disclosure of which is incorporated herein.

FIELD OF THE INVENTION

The present invention relates to solid lubricants used in high temperature environments. More particularly, the present invention relates to solid lubricants containing triphenyl phosphate, a solid lubricant, such as graphite, and a soft metal.

BACKGROUND OF THE INVENTION

Solid lubricants are used to reduce friction and wear on various parts in rotary kilns, utilized in the manufacturing process of lime, cement, kaolin, pulp, paper and the like. Selection of the components of the lubricant is critical to prevent auto-ignition of the lubricant below the operating temperature of the environment in which the lubricant is deposited. Kiln environments achieve temperatures of 1,000 degrees Fahrenheit (537 degrees Celsius) or more. Conventional lubricants containing paraffin have lower auto-ignition temperatures and are thus often unsuitable for such high temperature environments. Organo phosphate materials which have higher auto-ignition temperatures have been used previously in liquid lubricants, but not a solid lubricant.

It would be desirable to have a solid lubricant having an auto-ignition temperature suitable for use in very high temperature environments, such as in kilns located in lime, and cement plants, and the like, where temperatures can exceed 1,000 degrees Fahrenheit (537 degrees Celsius).

SUMMARY OF THE INVENTION

The present invention provides a solid lubricant bar for use in high temperature settings. The bar comprises a carrier, a solid lubricant and a soft metal. The carrier can be an organophosphate, such as triphenyl phosphate. The solid lubricant can be carbon, graphite or the like. Silica gel and/or inorganic clay may be added as a thickener. The soft metal can be copper, aluminum, tin, mixtures thereof or the like. In a preferred embodiment the ratio of materials is about 60% triphenyl phosphate and about 40% solids (i.e., solid lubricant and soft metal). The solid lubricant bar has an auto-ignition temperature of preferably at least about 1,000 degrees Fahrenheit (537 degrees Celsius).

The present invention also provides a method of forming the composition of the present invention comprises first melting the carrier (e.g., TPP) to provide for easy mixing of the composition. The solid lubricant in powdered form and the soft metal, in powdered or flake form, is added to the melted liquid carrier and mixed. The mixture thus formed is poured into molds where the mixture is allowed to cool and the carrier solidifies. The molds can produce a bar or other desired shape. When solidified, the composition provides a solid lubricant bar in which the graphite or other solid lubricant component and the soft metal provide the significant portion of load carry lubrication action, while the carrier acts as a mild anti-wear (antioxidant) agent.

Other features and advantages of the present invention will become apparent upon reading the following detailed description of embodiments of the invention, when taken in conjunction with the appended claims.

DETAILED DESCRIPTION OF THE EMBODIMENTS

The present invention provides, in general, a solid lubricant bar (or other shape) comprising a carrier, a solid lubricant and a soft metal. The carrier of the lubrication bar is a material that has a high ignition temperature to prevent burning at high use temperatures. In one embodiment triphenyl phosphate ("TPP") is used as an organophosphate carrier. TPP is desirable because it has a high auto-ignition temperature (in the range of 1,000 degrees Fahrenheit (537 degree Celsius), thereby making it suitable for high temperature environments, such as kilns utilized in the process of lime, cement, and other manufacturing plants.

For lower temperature environments, synthetic wax and/or paraffin can be incorporated into the solid lubricant to vary the melting point and performance parameters. In one embodiment where wax is used, the wax is a paraffin having a melting point of 125–127 degrees Fahrenheit (about 52–53 degrees Celsius), such as, paraffin wax No. 1230 by International Waxes Ltd. The copolymer is an ethylene acrylic acid copolymer having a melting point of 103–110 degrees Celsius, namely, ethylene copolymer EAS-1 by BASF or an ethylene-vinyl acetate copolymer consisting predominantly of polyethylene having a melting point of 87–92 degrees Celsius, namely, polyethylene glycol EVA-1 also by BASF. The advantage of using paraffin as the carrier over a copolymer or a polymer is that paraffin melts leaving very little harmful residue behind, whereas the polymers or copolymers may leave a fair amount of plastic residue behind after they have melted and vaporized.

The organic compounds containing phosphorus for use as the extreme pressure agent in the present invention are phosphite esters and phosphate esters. The phosphite esters include, but are not limited to, triphenyl phosphite, tricresyl phosphite, diphenylnonylphenyl phosphite, tris (nonylphenyl) phosphite, triisooctyl phosphite, diphenylisodecyl phosphite, phenyldiisodecyl phosphite, mixtures thereof and the like. The phosphate esters include, but are not limited to triphenyl phosphate, tricresyl phosphate, trixylenyl phosphate, cresyldiphenyl phosphate, octyldiphenyl phosphate, xylenyldiphenyl phosphate, trilauryl phosphate, tricetyl phosphate, tristearyl phosphate, trioleyl phosphate oleylydrogen phosphate, mixtures thereof and the like.

The lubricant of the lubrication bar comprises a material selected from the group consisting of powdered carbon, graphite, molybdenum, boron, boron nitride, tungsten, polytetrafluoroethylene, and mixtures thereof. In one embodiment graphite is used, available from Applied Carbon Technology, Brocton, N.Y. The silica gel or inorganic clay or mixtures thereof can be used as fillers and carriers, as opposed to providing lubricity to the mix, they are more typically used as gelling agents. The other products listed provide anti-wear and extreme pressure characteristics to the finished product.

The soft metal is selected from the group consisting of copper, aluminum, tin, or a mixture thereof. While possibly too reactive, for certain applications zinc and/or lead can be used. The soft metal is provided in flake or powdered form.

In one embodiment the ratio of materials is about 60% TPP and about 40% solids (i.e., solid lubricant and soft metal). A broader range would consist of 100% TPP, or any percentage of the mixture of the TPP in conjunction with about 1 to about 50% of either solid or a combination of the two solids. One could alternatively substitute any one of the other lubricity components, from the list above, and have a functionally quality product design to lubricate and reduce wear. In another embodiment, TPP can be used as the sole carrier and up to a total of about 50% solids (i.e., solid lubricant and soft metal) are added. The combination of the solid lubricant (for example, but not by way of limitation, graphite) and metal (for example, but not by way of limitation, copper) mix can vary by about 1%, i.e., up to about 49% graphite and about 1% copper at one end of the range and up to about 49% copper and about 1% graphite may be used. In one embodiment it is preferable to limit copper to under about 10% to manage environmental, reporting requirements and costs.

In one embodiment, the combination of solids, graphite or its substitutes can be down to about 1% with a minimum level of about 5% to be beneficial. The copper, or it's substitutes, now used at a maximum of about 10% due to environmental concerns, could be as low as a trace amount, and the ratio varied upward to obtain premium/optimum performance, only limited by cost and a maximum saturation point in the finished product.

The copper is selected from copper powders having a maximum percent retention on No. 325 mesh of about 1.5%, such as, Copper Flake Powder No. 530 by Canbro. The zinc is selected from zinc dusts having an average particle size of about 3.50–4.50 microns, such as, Zinc Dust UP4 by Purity Zinc. The aluminum is selected from aluminum powders having a maximum percent retention on No. 325 mesh of about 1.5%, such as, Aluminum Powder No. 805 by Canbro. The advantage of using copper powder is that it is the second most economical metal lubricant powder and it dissipates heat quite effectively.

In the one embodiment, the noble metal powder is selected from the group consisting of copper, silver or a mixture thereof. The copper is selected from copper powders having a maximum percent retention on No. 325 mesh of about 1.5%, such as, Copper Flake Powder No. 530 by Canbro. The silver is selected from silver powders having a maximum percent retention on No. 325 mesh of about 1.5%, such as, silver powder by Johnson and Matthey. The advantage of using copper powder is already mentioned hereinabove, but silver powder dissipates heat even more than copper powder. Any of the metals could be utilized, including, but not limited to, zinc, aluminum, silver, gold, copper, lead, tin, antimony, and the like, when reactivity or cost is not a concern.

A method of forming the composition of the present invention comprises first melting the carrier (e.g., TPP) to provide for easy mixing of the composition. The solid lubricant in powdered form and the soft metal, in powdered or flake form, is added to the melted liquid carrier and mixed. The mixture thus formed is poured into molds where the mixture is allowed to cool and the carrier solidifies. The molds can produce a bar or other desired shape. When solidified, the composition provides a solid lubricant bar in which the graphite or other solid lubricant component and the soft metal provide the significant portion of load carry lubrication action, while the carrier acts as a mild anti-wear (anti-oxidant) agent. The molds are sized to provide bars of lubricant which can be easily inserted between the load bearing filler bars of the kiln, or kiln shell and the inside bore of the riding ring. Since the kiln operates at elevated temperatures, the carrier melts and the solid lubricants flow over and are deposited on the friction surfaces. If the bar is extruded the percentage of solids may be as high as about 90%.

The present invention also provides a solid lubricant bar produced by the process described above and in the Example.

Utilizing the TPP provides a lower melt point than microcrystalline wax, and provides significantly higher auto-ignition points over both paraffin and microcrystalline wax. These benefits allow the use of the TPP to replace the microcrystalline wax in the formula without raising the melt point. It also allows for replacement of the paraffin wax when a lower melt point is desired. The current formula (non TPP) utilizes both of the paraffin and microcrystalline waxes in the formula at varying percentages to alter melt point and enhance the solubility of the solids in the paraffin wax. The use of TPP aids in the elimination of a potentially tacky residue being formed on the equipment surfaces when it is used to replace the paraffin wax.

EXAMPLE

Example 1

A batch of 50 lbs. is made by first taking the TPP or mixture of wax and measuring out the 30 lbs. of wax/carrier, pouring it into a kettle and applying heat and agitation to liquefy the solid wax/TPP carrier. Once the carrier has become liquid, 15 lbs. of the graphite in powdered form is added to the batch and mixed thoroughly. 5 lbs. of flaked copper is then added and mixed again to obtain a homogenous blend. Then the complete mixture is poured into molds while hot, and the molds are stored and allowed to cool. As the product cools it becomes a solid once again.

When the product has cooled sufficiently we remove the bars from the mold and package the bars. It is possible to use an extruder, which may reduce the man hours, labor costs, increases production and improves product uniformity.

Example 2

A product sample was tested using the ASTM method E-659. The heating apparatus has 4 thermocouple points (3 on the outside and 1 on the inside), which must be equivalent before the sample is inserted. The sample was crushed at room temperature and sent down a chute into a flask that is maintained at the constant temperature interval. Ten (10) temperature samples were used starting at 790 degrees Fahrenheit (421° C.) and going up by 30° F. until 1090° F. was reached. The maximum temperature of the apparatus was 1090° F., because of the aluminum foil leads on the thermocouples. Therefore, the auto-ignition point of the polymer is >1090° F. (588° C.).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

What is claimed is:

1. A solid lubricant for lubricating trunnion supported rotary equipment comprising:
 a) an organo phosphate;
 b) a lubricating material selected from the group consisting of carbon, graphite, molybdenum, boron, boron nitride, tungsten, silica gel, inorganic clay, polytetrafluoroethylene, and mixtures thereof;

c) a metal selected from the group consisting of copper, aluminum, tin and mixtures thereof, and said solid lubricant having an auto-ignition point of at least about 1,000 degrees Fahrenheit (537 degree Celsius).

2. The solid lubricant of claim 1, wherein the ratio of said organic phosphate material to lubricating material and metal is about 60:40.

3. The solid lubricant of claim 1, wherein said lubricating material and metal are present in a range of from about 1–50% and the remainder is essentially an organophosphate.

4. The solid lubricant of claim 1, wherein said graphite and said copper are present in a concentration range of from about 49% graphite and about 1% copper to about 1% graphite and 49% copper.

5. A solid lubricant for lubricating trunnion supported rotary equipment comprising:
   a) an organo phosphate;
   b) lubricating material selected from the group consisting of carbon, graphite, molybdenum, boron, boron nitride, tungsten, silica gel, inorganic clay, polytetrafluoroethylene, and mixtures thereof; and
   c) a metal is selected from the group consisting of zinc and lead and mixtures thereof;
said solid lubricant having an auto-ignition point of at least about 1,000 degrees Fahrenheit (537 degree Celsius).

6. The solid lubricant of claim 1, wherein said metal is a copper powder having a maximum percent retention in No. 325 mesh of about 1.5%.

7. A solid lubricant for lubricating trunnion supported rotary equipment, comprising:
   a) an organo phosphate;
   b) a lubricating material selected from the group consisting of carbon, graphite, molybdenum, boron, baron nitride, tungsten, silica gel, inorganic clay, polytetrafluoroethylene, and mixtures thereof; and
   b) a silver powder having a maximum percent retention in No. 325 mesh of about 1.5%;
said solid lubricant having an auto-ignition point of at least about 1,000 degrees Fahrenheit (537 degree Celsius).

8. The solid lubricant of claim 1, wherein said copper is present in an amount of up to 10%.

9. The solid lubricant of claim 1, further comprising at least one carrier selected from the group consisting of paraffin and synthetic wax.

10. A method of forming a solid lubricant, comprising:
   a) melting a quantity of triphenyl phosphate to form a liquid or semi-liquid;
   b) adding to the liquid or semi-liquid of step (a) a quantity of a solid lubricating material in powdered form selected from the group consisting of graphite, molybdenum, boron, boron nitride, tungsten, silica gel, inorganic clay, polytetrafluoroethylene, and mixtures thereof, and a quantity of a metal in flake or powdered form selected from the group consisting of copper, aluminum, tin and mixtures thereof;
   c) mixing the components of step (b) to form a mixture;
   d) extruding the mixture of step (c) into a shape; and,
   e) allowing the extruded shape of step (d) to cool to form a solid lubricant,
      i) said solid lubricant having an auto-ignition temperature of at least 1,000 degrees Fahrenheit (537 degrees Celsius).

11. A solid lubricant formed by a process, comprising:
   a) melting a quantity of triphenyl phosphate to form a liquid or semi-liquid;
   b) adding to the liquid or semi-liquid of step (a) a quantity of a solid lubricating material in powdered form selected from the group consisting of graphite, molybdenum, boron, boron nitride, tungsten, silica gel, inorganic clay, polytetrafluoroethylene, and mixtures thereof, and a quantity of a metal in flake or powdered form selected from the group consisting of copper, aluminum, tin and mixtures thereof;
   c) mixing the components of step (b) to form a mixture;
   d) extruding the mixture of step (c) into a shape; and,
   e) allowing the extruded shape of step (d) to cool to form a solid lubricant,
said solid lubricant having an auto-ignition temperature of at least 1,000 degrees Fahrenheit (537 degrees Celsius).

12. A method of forming a solid lubricant, comprising:
   a) providing a quantity of organo phosphate in a flowable form;
   b) adding to the organo phosphate of step a) a quantity of powdered graphite;
   c) mixing the mixture in step b);
   d) forming the mixture of step c) into a shape.

13. The method of claim 12, wherein in the forming step d) the mixture of step c) is poured while liquid into at least one mold and allowed to cool to form a substantially solid material.

14. The method of claim 12, wherein in the forming step d) the mixture of step c) is extruded to form a shape.

15. The method of claim 12, further comprising the step of cooling said extruded shape to form said solid lubricant.

* * * * *